United States Patent
Kim

(10) Patent No.: US 6,853,436 B2
(45) Date of Patent: Feb. 8, 2005

(54) METHOD AND APPARATUS FOR DRIVING FERROELECTRIC LCD AND ALIGNING METHOD UNDER ELECTRIC FIELD APPLIED THERETO

(75) Inventor: Hong Chul Kim, Ahnsan-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 41 days.

(21) Appl. No.: 10/607,201

(22) Filed: Jun. 27, 2003

(65) Prior Publication Data

US 2004/0057001 A1 Mar. 25, 2004

(30) Foreign Application Priority Data

Aug. 30, 2002 (KR) ................. 10-2002-0052032

(51) Int. Cl.⁷ ............................ G02F 1/133; G02F 1/13
(52) U.S. Cl. ........................................ 349/191; 349/37
(58) Field of Search ................... 349/191, 188, 349/171, 37; 345/96, 97

(56) References Cited

U.S. PATENT DOCUMENTS

| | | | | |
|---|---|---|---|---|
| 5,349,366 A | * | 9/1994 | Yamazaki et al. | 345/92 |
| 5,469,281 A | * | 11/1995 | Katakura et al. | 345/89 |
| 5,488,388 A | * | 1/1996 | Taniguchi et al. | 345/97 |
| 5,742,369 A | * | 4/1998 | Mihara et al. | 349/123 |
| 5,754,263 A | * | 5/1998 | Akiyama et al. | 349/110 |
| 5,844,651 A | * | 12/1998 | Reimer et al. | 349/134 |
| 5,880,804 A | * | 3/1999 | Yamaguchi et al. | 349/188 |
| 6,195,137 B1 | * | 2/2001 | Inaba et al. | 349/37 |
| 6,335,717 B2 | * | 1/2002 | Hasegawa et al. | 345/97 |
| 6,674,421 B2 | * | 1/2004 | Mori et al. | 345/96 |
| 6,703,993 B2 | * | 3/2004 | Miura et al. | 345/87 |
| 6,710,842 B2 | * | 3/2004 | Munakata et al. | 349/172 |
| 6,762,812 B2 | * | 7/2004 | Hasegawa et al. | 349/132 |
| 2002/0039091 A1 | * | 4/2002 | Saishu et al. | 345/97 |

* cited by examiner

*Primary Examiner*—Kenneth Parker
(74) *Attorney, Agent, or Firm*—McKenna Long & Aldridge LLP

(57) ABSTRACT

A method of aligning Half V-Switching Mode ferroelectric liquid crystal material in the presence of an applied electric field, a driving method, and an apparatus for driving a ferroelectric liquid crystal display using the same has a high response speed characteristics and a wide viewing angle characteristics. The liquid crystal material has a small capacitance, C, and is driven according to a double frequency column inversion driving method operating at about 120 Hz to display a picture.

14 Claims, 20 Drawing Sheets

FIG.5A
RELATED ART
ALIGNMENT WITH
ELECTRIC FIELD
 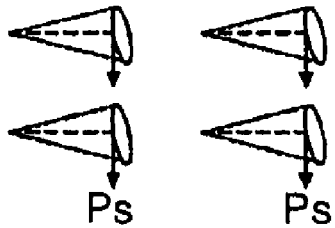
FIG.5B
RELATED ART
APPLICATION
OF EXTERNAL
ELECTRIC FIELD
 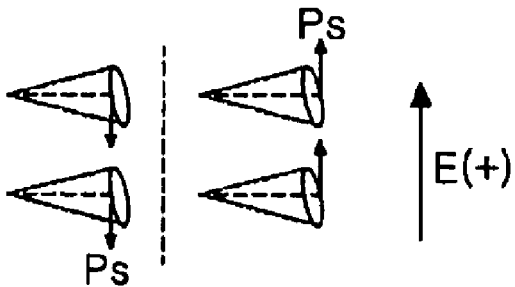

FIG.6A
RELATED ART

ODD-NUMBERED FRAME

| + | − | + | − | + | − | + | − |
|---|---|---|---|---|---|---|---|
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |

FIG.6B
RELATED ART

EVEN-NUMBERED FRAME

| − | + | − | + | − | + | − | + |
|---|---|---|---|---|---|---|---|
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |

FIG. 7A
RELATED ART
ODD-NUMBERED FRAME
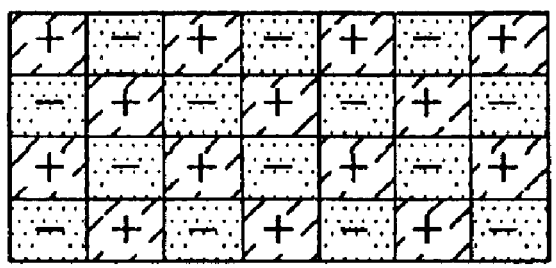
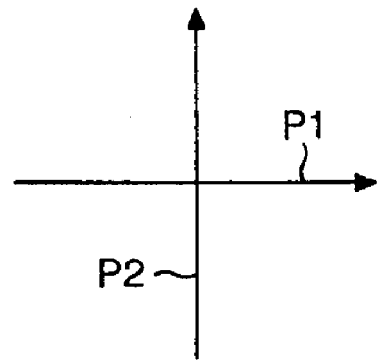
☐ : LIGHT TRANSMITTED
☐ : LIGHT INTERCEPTED
FIG. 7B
RELATED ART
EVEN-NUMBERED FRAME
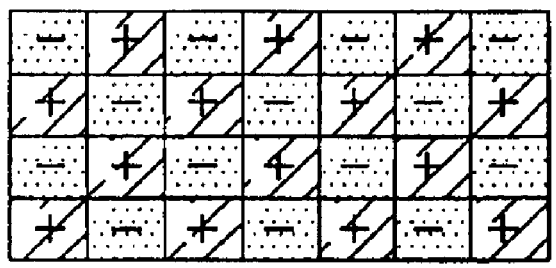
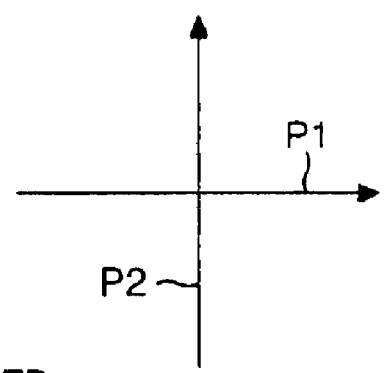
☐ : LIGHT TRANSMITTED
☐ : LIGHT INTERCEPTED

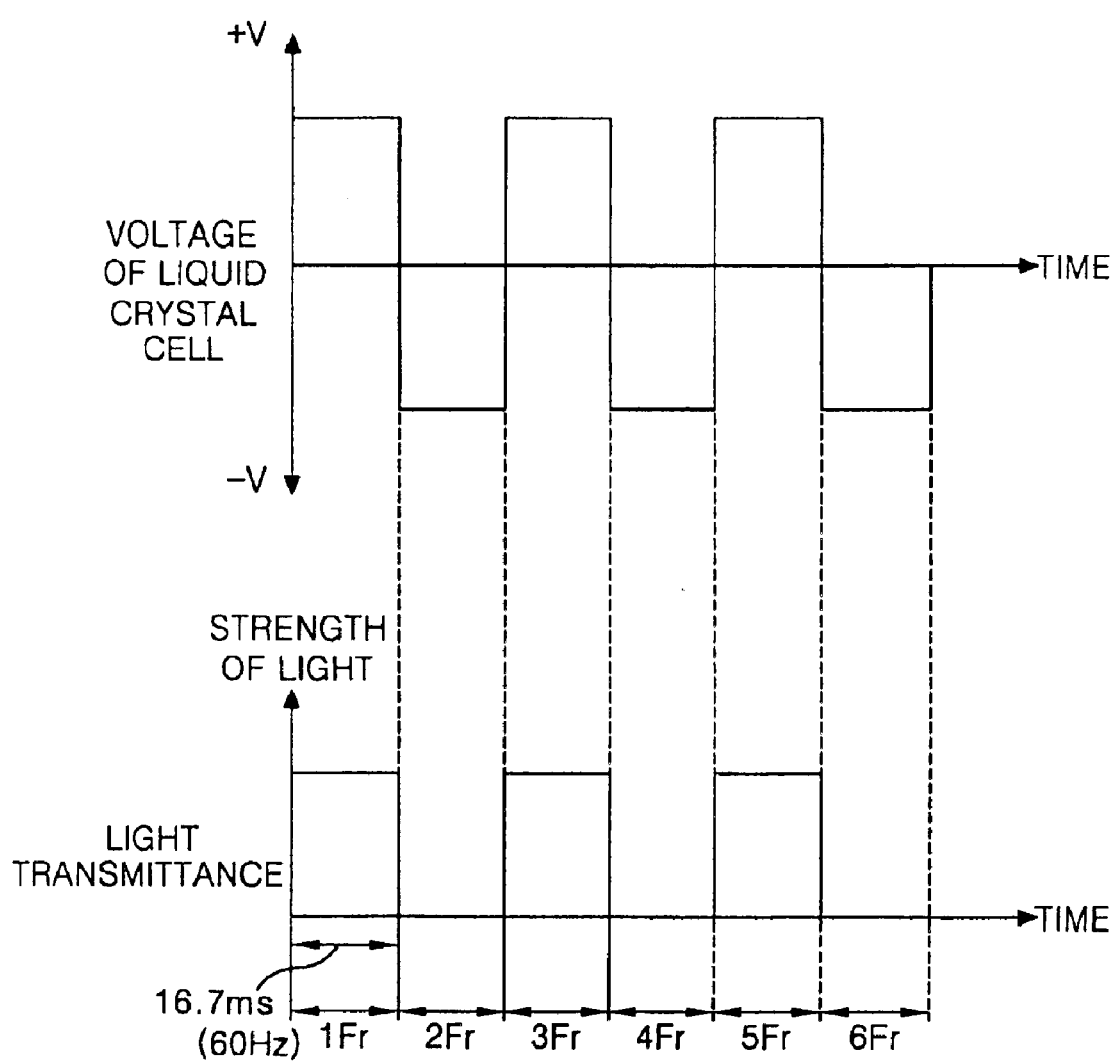

(a) CRT (b) LCD

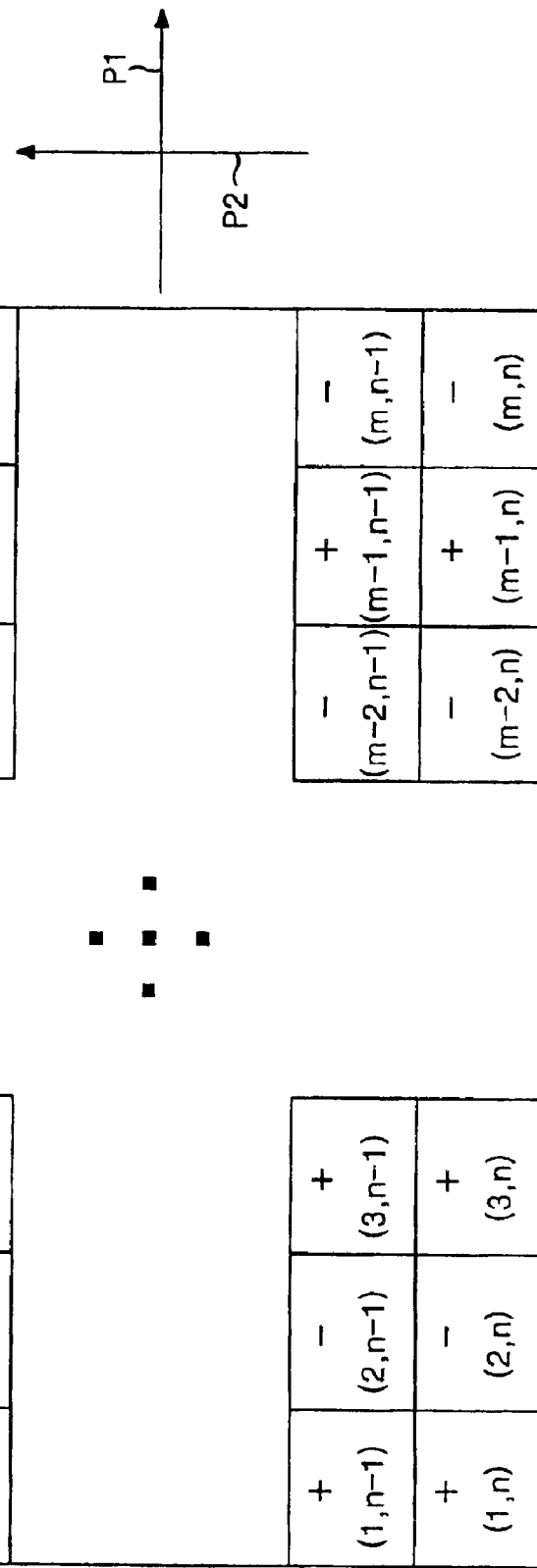

FIG.22B

EVEN-NUMBERED FRAME

|  | (1,1) | (1,3) | (1,1) | | (1,n−1) | (1,n) |
|---|---|---|---|---|---|---|
|  | + (2,1) | + (2,2) | + (2,3) | | + (2,n−1) | + (2,n) |
|  | − (3,1) | − (3,2) | − (3,3) | | − (3,n−1) | − (3,n) |

(center dots)

|  | + (m−2,1) | + (m−2,2) | + (m−2,3) | | + (m−2,n−1) | + (m−2,n) |
|---|---|---|---|---|---|---|
|  | − (m−1,1) | − (m−1,2) | − (m−1,3) | | − (m−1,n−1) | − (m−1,n) |
|  | + (m,1) | + (m,2) | + (m,3) | | + (m,n−1) | + (m,n) |

P1 ↑
← P2

METHOD AND APPARATUS FOR DRIVING FERROELECTRIC LCD AND ALIGNING METHOD UNDER ELECTRIC FIELD APPLIED THERETO

This application claims the benefit of Korean Patent Application No. P2002-52032, filed on Aug. 30, 2002, which is hereby incorporated by reference for all purposes as if fully set forth herein.

BACKGROUND OF THE INVENTION

1. Field of the Invention

The present invention relates to ferroelectric liquid crystal displays (LCDs), and more particularly to a ferroelectric LCD electric-field-alignment method, a driving method, and an ferroelectric LCD using the same for facilitating the generation of moving images by an LCD panel.

2. Description of the Related Art

Generally, LCDs display pictures by applying electric fields to a layer of liquid crystal material in response to an applied video signal, wherein the applied electric field controls the orientation liquid crystal molecules within the layer of liquid crystal material.

Generally, the liquid crystal material within LCDs exhibits an intermediate material phase between solid and liquid phases wherein liquid crystal molecules exhibit both fluidity and elasticity. Currently, the most common type of liquid crystal material used in LCDs include twisted nematic mode (TN mode) liquid crystal material. Though the response speed of the TN mode LCDs can vary in accordance with physical properties of the liquid crystal material, cell gap, etc., the response time for TN mode LCDs is generally greater than one picture frame of about 16.67 ms (according to the National Television System Committee NTSC). Accordingly, moving images displayed by TN mode LCDs often appear blurred and undesirably include contour trails. To overcome the aforementioned problems, TN mode liquid crystal material can be replaced by ferroelectric liquid crystal (FLC) material having a response speed generally greater than that of TN mode liquid crystal material. Therefore, LCDs injected with FLC material can display high quality moving pictures.

FLC material exhibits a lamellar structure, wherein each layer of FLC material has the same electric and magnetic properties. Accordingly, when FLC material is driven, molecules of FLC material within the same layer spontaneously rotate (i.e., polarize) along a virtual cone in response to an applied electric field. In the absence of an applied electric field, molecules within the FLC material spontaneously polarize to an original alignment orientation. Accordingly, when external electric fields are applied to the FLC material, molecules within the FLC material rotate rapidly by interaction of an external field and exhibit spontaneous polarization. The response speed of FLC material is typically between a hundred or a thousand times faster than other modes of liquid crystal material. Further, FLC material has an inherent in-plane-switching property and can therefore be used to provide LCDs with wide viewing angles without special electrode structures or compensation films. Depending on its behavior in the presence of applied electric fields, FLC material may be classified as V-Switching or Half V-Switching Modes.

V-Switching Mode FLC material exhibits the following thermodynamic phase transformations upon decreasing temperature: isotropic→smectic A phase (SA)→smectic X phase (Sm X*)→crystalline. At the isotropic phase, molecules within the FLC material are oriented and distributed substantially isotropically (e.g., randomly). At the smectic A phase (SA) phase, molecules within the FLC material are divided into symmetrically arranged layers of vertically arranged molecules. At the smectic X phase (Sm X*) phase, molecules within the FLC material are arranged according to an intermediate order between smectic A and crystalline phases.

FIG. 1 illustrates a graph of transmissivity of incident light versus voltage applied to a V-Switching Mode ferroelectric liquid crystal cell.

Referring to FIG. 1, the transmissivity of light incident to a V-Switching Mode FLC cell exhibiting the smectic X phase (Sm X*) is dependent upon the polarity of an applied driving data voltage (e.g., +V and −V). Accordingly, the arrangement of liquid crystal molecules within V-Switching Mode FLC material may be affected by the applied external voltage. V-Switching Mode FLC material beneficially has high response speed and wide viewing angle characteristics but disadvantageously requires a large amount of power in order to be driven because a capacitance value of the V-Switching Mode FLC material is relatively large. Therefore, a capacitance value of a storage capacitor used to maintain applied data voltages are also be large. Accordingly, if V-Switching Mode FLC material is used LCDs, an aperture ratio of the LCD becomes low since the power consumption of LCD and an electrode area of a sub-capacitor increases.

Half V-Switching Mode FLC material beneficially has a high response speed and wide viewing angle characteristics and further has a relatively low capcitance value. Therefore, Half V-Switching Mode FLC material is often used to display moving pictures.

FIG. 2 illustrates phase transformations of Half V-Switching Mode ferroelectic liquid crystal material.

Referring to FIG. 2, upon decreasing temperature below the phase transformation temperature (Tni), Half V-Switching Mode FLC material exhibits a phase transformation from the isotropic to the nematic phase (N*), below phase transformation temperature (Tsn), the Half V-Switching Mode FLC material exhibits a phase transformation from the nematic phase (N*) to the smectic C phase (Sm C*), and below phase transformation temperature (Tcs) the Half V-Switching Mode FLC material exhibits a phase transformation from the smectic C phase to the crystalline phase. Therefore, as the temperature decreases, Half V-Switching Mode FLC material exhibits the following thermodynamic phase transformations: isotropic→nematic (N*)→smectic C phase (Sm C*)→crystalline.

FIG. 3 illustrates the fabrication of a liquid crystal cell including Half V-Switching Mode FLC material.

Referring to FIG. 3, Half V-Switching Mode FLC material is typically injected into a liquid crystal cell at a temperature above Tni. Accordingly, upon being injected into the liquid crystal cell, molecules within the FLC material are oriented and distributed substantially isotropically (e.g., randomly). Upon lowering the temperature of the FLC material below Tni, molecules within the FLC material become aligned substantially parallel to each other along a direction dictated by the rubbing direction of an orientation layer and the FLC material exhibits the nematic phase (N*). If the temperature of the FLC material is further lowered the temperature below Tsn in the presence of an electric field, the FLC material exhibits the smectic phase (C*) and the liquid crystal molecules spontaneously polarize along the direction of the applied electric field to exhibit a monostable state, wherein liquid crystal molecules uniformly assume one of two possible molecular arrangements. If, on the other hand, the temperature of the FLC material is lowered below Tsn in the absence of the applied electric field, the liquid crystal molecules become separated into layers to exhibit a bistable state, wherein liquid crystal molecules within each layer uniformly assume one of the two possible molecular arrangements. Further, the distribution of the molecular arrangements within the layers is substantially random. In view of the above, it generally more difficult to uniformly control of the FLC material exhibiting the bistable than to uniformly control of the FLC material exhibiting the monostable state. Accordingly, the Half V-Mode FLC cells are generally fabricated to exhibit the monostable state by cooling the FLC material below Tsn in the presence of an electric filed generated by applying a small direct current (DC) voltage to the LCD panel.

Referring still to FIG. 3, the symbol "⊗" describes the direction of the applied electric field as extending out of the plane of the illustration. Therefore the spontaneous polarization direction of the FLC material also extends out of the plane of the illustration. Accordingly, electrodes used to generate the applied electric field are formed on upper and lower plates of the liquid crystal cell, extending out of the plane of the illustration. Further, the orientation layer described above is formed on the upper and lower plates.

FIGS. 4A and 4B illustrate the dependence of light transmissivity on a voltage applied to a Half V-Switching Mode FLC cell.

Referring to FIG. 4A, Half V-Switching Mode FLC cells containing FLC material aligned in the presence of an applied electric field generated by a voltage having a negative polarity (−V) (i.e., fabricated in the presence of an electric field having a negative polarity), transmit light in the presence of an applied voltage having a positive polarity (+V) by rotating a polarization axis of the light by 90°. The light transmissivity of the Half V-Switching Mode FLC cell increases proportionally to the intensity of an applied positive electric field generated by the positive voltage (+V). Further, the light transmissivity of the Half V-Switching Mode FLC cell attains a maximum value when the intensity of the applied positive electric field is greater than a fixed threshold value of the FLC material. In the presence of an applied voltage having a negative voltage (−V), the Half V-Switching Mode FLC cell does not rotate the polarization axis of the light. Accordingly, in the presence of an applied voltage having a negative polarity, the Half V-Switching Mode FLC cell transmits substantially no light (i.e., the Half V-Switching Mode FLC cell intercepts the light).

Referring to FIG. 4B, Half V-Switching Mode FLC cells containing FLC material aligned in the presence of an applied electric field generated by a voltage having a positive polarity (+V) (i.e., fabricated in the presence of an electric field having a positive polarity), transmit light in the presence of an applied voltage having a negative polarity (−V). Further, in the presence of an applied voltage having a positive polarity (+V), the Half V-Switching Mode FLC cell does not rotate the polarization axis of the light. Accordingly, in the presence of an applied voltage having a positive polarity, the Half V-Switching Mode FLC cell intercepts the light.

FIGS. 5A and 5B illustrate the orientation directions of Half V-Switching Mode FLC material in the presence of applied electric fields used to fabricate the liquid crystal cell and applied electric fields used to drive the liquid crystal cell, respectively.

Referring to FIG. 5A, when the Half V-Switching Mode FLC cell is fabricated in the presence of an externally applied electric field generated by a voltage having a negative polarity, the spontaneous polarization direction (Ps) of FLC material becomes uniformly aligned to the direction of the externally applied electric field having the negative polarity (E(−)). Referring to FIG. 5B, if, during a subsequent driving of the LCD panel, an electric field having a positive polarity (e.g., an electric field generated by applying a voltage having a positive polarity to the LCD panel) (E(+)) is applied to the fabricated Half V-Switching Mode FLC cell, the FLC material spontaneously polarizes along a spontaneous polarization direction (Ps) uniformly aligned with the direction of the applied electric field having the positive polarity. Accordingly, a polarization state of light incident to a lower plate of the LCD panel may be rotated to substantially align with the polarization direction of an upper polarizer on an upper plate via the FLC material, having the spontaneous polarization direction (Ps) uniformly aligned with the externally applied electric field having the positive polarity, and the incident light is transmitted through the upper plate. If, however, during driving of the LCD panel, the applied external electric field is generated by an applied voltage having a negative polarity (and thus itself has a negative polarity (E(−)), or if, during driving, no electric field is applied, the FLC material remains uniformly aligned along its initial spontaneous polarization direction (Ps) (characterized by the applied electric field having the negative polarity) and the incident light beam is not transmitted through the upper plate (i.e., the light is intercepted by the liquid crystal cell).

If, during fabrication, the entire LCD panel is uniformly aligned under an applied electric field having a single polarity (e.g., a positive polarity (+) or a negative polarity (−)), defects may be generated within the fabricated Half V-Switching Mode FLC cell when the LCD panel is driven according to an inversion driving method. Such defects may be manifested by the lowering of a brightness of displayed pictures and flickering (e.g., blinking) of the displayed pictures. Such flickering may be reduced by employing inversion driving methods to drive LCD panels, wherein the inversion driving methods also prevent a degradation of liquid crystal material within the LCD panel by inverting the polarity of applied data voltages between predetermined periods of the LCD panel. For example, a frame inversion driving method inverts the polarity of data voltages applied between successive frame periods at a frequency of 60 Hz, in correspondence with the frame period of 16.7 ms. A line inversion driving method inverts the polarity of data voltages between successive frame periods and horizontal lines. A column inversion driving method inverts the polarity of data voltages between successive frame periods and vertical lines. Lastly, a dot inversion driving method inverts the polarity of data voltages between successive frame periods, horizontal lines, and vertical lines, as shown in FIGS. 6A and 6B. Because the polarity of data voltages can be inverted between successive frame periods, horizontal lines, and vertical lines, the dot inversion driving method is most commonly used within LCDs to minimize flickering.

LCDs including a plurality of Half V-Switching Mode FLC cells, fabricated in the presence of a uniformly applied electric field having a negative polarity and arranged in a matrix pattern, may be driven according to the dot inversion driving method. Accordingly, and with reference to FIGS. 7A and 7B, horizontally and vertically adjacent ones of Half V-Switching Mode FLC cells arranged within an LCD panel may alternately transmit and intercept light because each Half V-Switching Mode FLC cells can only transmit light in the presence of an applied electric field having a positive polarity. For example, odd ones of the FLC cells arranged within odd horizontal lines of liquid crystal cells and even ones of the FLC cells arranged within even horizontal lines of liquid crystal cells transmit light in response to an electric field having a positive polarity (+) applied during odd frames (see FIG. 7A) and intercept light in response to an electric field having a negative polarity (−) applied during even frames (see FIG. 7B). Moreover, even ones of the FLC cells arranged within odd horizontal lines of liquid crystal cells and odd ones of the FLC cells arranged within even horizontal lines of liquid crystal cells transmit light in response to an electric field having a positive polarity (+) applied during even frames (see FIG. 7B) and intercept light in response to an electric field having a negative polarity (−) applied during odd frames (see FIG. 7A).

Referring still to FIG. 7A and FIG. 7B, reference numerals 'P1' and 'P2' indicate the polarization axes of polarization plates arranged on upper and lower substrates of the LCD panel, respectively. The polarization axis of each polarization plate determines polarization characteristics of light it will transmit. As shown in the Figures, the polarization axes of the upper and lower polarization plates are substantially perpendicular to each other. Within liquid crystal cells transmitting light, light having a polarization direction parallel to P1 (or P2) is transmitted by an incident polarization plate, through the FLC material, and is subsequently transmitted by a display polarization plate where the light transmitted by the display polarization plate has a polarization direction parallel to P2 (or P1). Within the liquid crystal cells intercepting light, light having a polarization direction parallel to P1 (or P2) is transmitted by an incident polarization plate is not transmitted to the display polarization plate having the polarization axis of P2 (or P1).

FIG. 8 illustrates a graph of a data voltage charged to a Half V-Switching Mode FLC cell within an LCD panel and the corresponding light transmissivity characteristics of the liquid crystal cell.

Referring to FIG. 8, a driving data voltage having a frequency of 60 Hz is uniformly applied to aforementioned FLC cells (e.g., FLC cells fabricated in the presence of an applied electric field having a negative polarity) arranged within the LCD panel. Accordingly, the polarity of the applied driving data voltage is inverted each successive frame period of the LCD panel (i.e., 16.7 ms). As a result, the FLC cells transmit light during odd frame periods 1Fr, 3Fr, 5Fr, etc., when the applied driving data voltage generates an electric field having a positive polarity (e.g., when the applied driving data voltage has a positive polarity, +V), and transmits substantially no light (i.e., intercepts light) when the applied driving data voltage generates an electric field having a negative polarity (e.g., when the applied driving data voltage has a negative polarity, −V). Therefore, when LCD panels including uniformly fabricated Half V-Switching Mode FLC cells are driven, the overall brightness of the LCD panel decreases and pictures displayed by the LCD panel appear to flicker because viewers perceive the transmitted light periodically within each frame period of the LCD panel.

Further, blurring or contour trailing occurs when the LCD panel displays moving pictures due to a slow response time of the FLC material and due to predetermined maintenance characteristics of the FLC material. Cathode ray tubes (CRTs) do not display pictures by maintain data voltages. Rather, CRTs are a type of impulse display system capable of displaying pictures instantaneously. Accordingly, the aforementioned blurring or contour trailing does not occur when moving pictures are displayed by CRTs. Referring to FIG. 9, CRTs display pictures by irradiating electrons onto a portion of a fluorescent screen for short amount of time within each frame period. Accordingly, each portion of the fluorescent screen remains dark for a portion of each frame period. In contrast, and with reference to FIG. 10, LCDs display pictures by charging data voltages to liquid crystal cells during a scanning period when gate high voltages (Vgh) are applied, wherein, once they are charged, the data voltages are maintained within the liquid crystal cells until they are refreshed in a successive frame period.

Referring to FIGS. 11 and 12, because CRTs display pictures instantly as impulse-type display systems, an observer's perception of a moving picture is clear. Due to response times of liquid crystal material within LCDs, however, an observer's perception of a moving image is not clear. The difference in image perception between the CRT and the LCD may be understood to result from an observer's eye tracking a displayed picture over successive frame periods as the picture is moving. Accordingly even if the response speed of LCD device is fast, observers sees displayed moving pictures unclearly.

SUMMARY OF THE INVENTION

Accordingly, the present invention is directed to a method and apparatus for driving a ferroelectric LCD and an electric field alignment method applied to a ferroelectric LCD that substantially obviates one or more of the problems due to limitations and disadvantages of the related art.

An advantage of the present invention provides a ferroelectric LCD electric-field-alignment method, a driving method, and an ferroelectric LCD using the same, capable of facilitating the generation of moving images.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a ferroelectric LCD electric-field-alignment method according may, for example, include steps of injecting a ferroelectric liquid crystal (FLC) material into liquid crystal cells arranged in a matrix pattern within a liquid crystal display (LCD) panel at an injection temperature at which the FLC material exhibits an isotropic or a nematic phase; lowering the temperature of the injected FLC material below a phase transformation temperature whereby the injected ferroelectric liquid crystal material exhibits a smectic C phase; and, while inducing the phase transformation in the injected FLC material, applying an electric field to the FLC material to align the FLC material, wherein the applied electric field has an alignment polarity pattern wherein a polarity of the applied electric field is inverted between adjacent vertical lines of liquid crystal cells within the LCD panel.

In one aspect of the present invention, the phase transformation temperature may be between about 60° C. and about 80° C.

In another aspect of the present invention, the applying the electric field to the FLC material may include applying a voltage of about ±1–9V to the LCD panel.

In yet another aspect of the present invention, light may be transmittable by liquid crystal cells containing the aligned FLC in the presence of an applied electric field having a driving polarity pattern opposite the alignment polarity pattern.

In accordance with principles of another aspect of the present invention, a method of driving a ferroelectric liquid crystal display may, for example, include steps of cooling FLC material below a phase transformation temperature where the FLC material undergoes a phase transformation from a nematic phase to a smectic C phase and, while inducing the phase transformation in the FLC material, aligning FLC material within a LCD panel in the presence of an applied electric field, wherein the applied electric field has an alignment polarity pattern wherein a polarity of the applied electric field is inverted between vertical lines of liquid crystal cells within the LCD panel; applying a first driving data voltage having a first polarity pattern to liquid crystal cells having the aligned FLC material during a first sub-frame period, less than a frame period of the LCD panel; and applying a second driving data voltage having a second polarity pattern, different from the first polarity pattern, to liquid crystal cells having the aligned FLC material during a second sub-frame period equal to the amount remaining within the frame period after the first sub-frame period.

In one aspect of the present invention, polarities of driving data voltages having the first and second polarity patterns, provided to consecutively arranged ones of adjacent vertical lines of the LCD panel, are opposite each other.

In another aspect of the present invention, the first polarity pattern is opposite the second polarity pattern.

In still another aspect of the present invention, the driving method may further include a step of applying a scan signal to the LCD panel to select a horizontal line of liquid crystal cells to which the driving data voltages may be applied.

In yet another aspect of the present invention, after aligning the FLC material within the LCD panel in the presence of the applied electric field, the driving method may further include a step of applying a driving data voltage to liquid crystal cells during the frame period of the LCD panel, wherein the driving data voltage has a driving polarity pattern, wherein the driving polarity pattern is substantially identical to the alignment polarity pattern.

In yet a further aspect of the present invention, liquid crystal cells containing the aligned FLC material may transmit light in the presence of an applied electric field having a polarity opposite the polarity of the applied electric field under which the FLC material was aligned within the liquid crystal cells.

In accordance with principles of still another aspect of the present invention, a driving apparatus for driving ferroelectric liquid crystal display may, for example, include a LCD panel having FLC material aligned in the presence of an applied electric field having an alignment polarity pattern, wherein a polarity of the applied electric field is inverted between vertical lines of liquid crystal cells within the LCD panel while the FLC material is cooled below a phase transformation temperature where the FLC material undergoes a phase transformation from a nematic phase to a smectic C phase; and a data driving integrated circuit for applying a first driving data voltage and a second driving data voltage, wherein the first driving data voltage has a first polarity pattern, wherein the second driving data voltage has a second polarity pattern, different from the first polarity pattern, wherein the first driving data voltage is applied to liquid crystal cells having the aligned FLC material during a first sub-frame period, less than a frame period of the LCD panel, and wherein the second driving data voltage is applied to liquid crystal cells having the aligned FLC material during a second sub-frame period equal to the amount remaining within the frame period of the LCD panel after the first sub-frame period.

In one aspect of the present invention, the data driving circuit may be connected to data lines of the LCD panel such that polarities of driving data voltages having the first and second polarity patterns, provided to consecutively arranged ones of adjacent vertical lines of the LCD panel, are opposite each other.

In another aspect of the present invention, after aligning the FLC material within the LCD panel in the presence of the applied electric field, the driving method may further include a step of applying a driving data voltage to liquid crystal cells during the frame period of the LCD panel, wherein the driving data voltage has a driving polarity pattern, wherein the driving polarity pattern is substantially identical to the alignment polarity pattern.

In still another aspect of the present invention, the driving apparatus may further include a scan driving circuit connected to gate lines of the liquid crystal display panel for applying scan signals to the gate lines, thereby selecting liquid crystal cells within a horizontal line to which the driving data voltages may be applied.

In yet another aspect of the present invention, the driving apparatus further may include a timing controller for controlling a driving of the data driving circuit and the scan driving circuit at a multiplied speed such that driving data voltages may be applied to liquid crystal cells of the LCD panel at least twice durgin a single frame period of the LCD panel.

In yet a further aspect of the present invention, the timing controller may, for example, drive the data driving circuit and the scan driving circuit at a frequency of 120 Hz.

In still a further aspect of the present invention, liquid crystal cells containing the aligned FLC material may transmit light in the presence of an applied electric field having a polarity opposite the polarity of the applied electric field under which the FLC material was aligned within the liquid crystal cells.

In one aspect of the present invention, the liquid crystal display panel may display a picture brightly within a first predetermined time period during the frame period in response to the driving data voltages and display the picture darkly during the a second predetermined time period during the frame period, wherein the second predetermined time period is equal to the amount remaining within the frame period after the first predetermined time period.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5A and 5B illustrate an orientation of Half V-Switching Mode ferroelectric liquid crystal material aligned in the presence of an applied electric field and orientations of Half V-Switching Mode ferroelectric liquid crystal material driven in the presence of electric fields having polarities substantially identical to, and different from, the polarity of the applied electric field present during the alignment;

FIGS. 6A and 6B illustrate a dot inversion driving method of driving a liquid crystal display panel;

FIGS. 7A and 7B illustrate light transmission and interception characteristics of uniformly aligned Half V-Switching Mode ferroelectric liquid crystal cells driven in accordance with the dot inversion driving method;

FIG. 8 illustrates a graph of a driving data voltage charged to Half V-Switching Mode ferroelectric liquid crystal cells and light transmissivity characteristics of the liquid crystal cells corresponding to the charged driving data voltage;

FIGS. 22A and 22B illustrate light transmission and interception characteristics upon application of the data voltages to the liquid crystal display panel in accordance with the principles of the present invention.

DETAILED DESCRIPTION OF THE ILLUSTRATED EMBODIMENTS

Reference will now be made in detail to embodiments of the present invention, examples of which are illustrated in the accompanying drawings.

Figure 1:
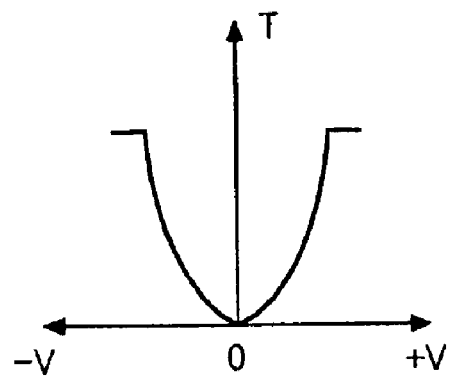
FIG. 1 illustrates a relationship between transmissivity of incident light and driving data voltages applied to V-Switching Mode ferroelectric liquid crystal cells.
Figure 2:
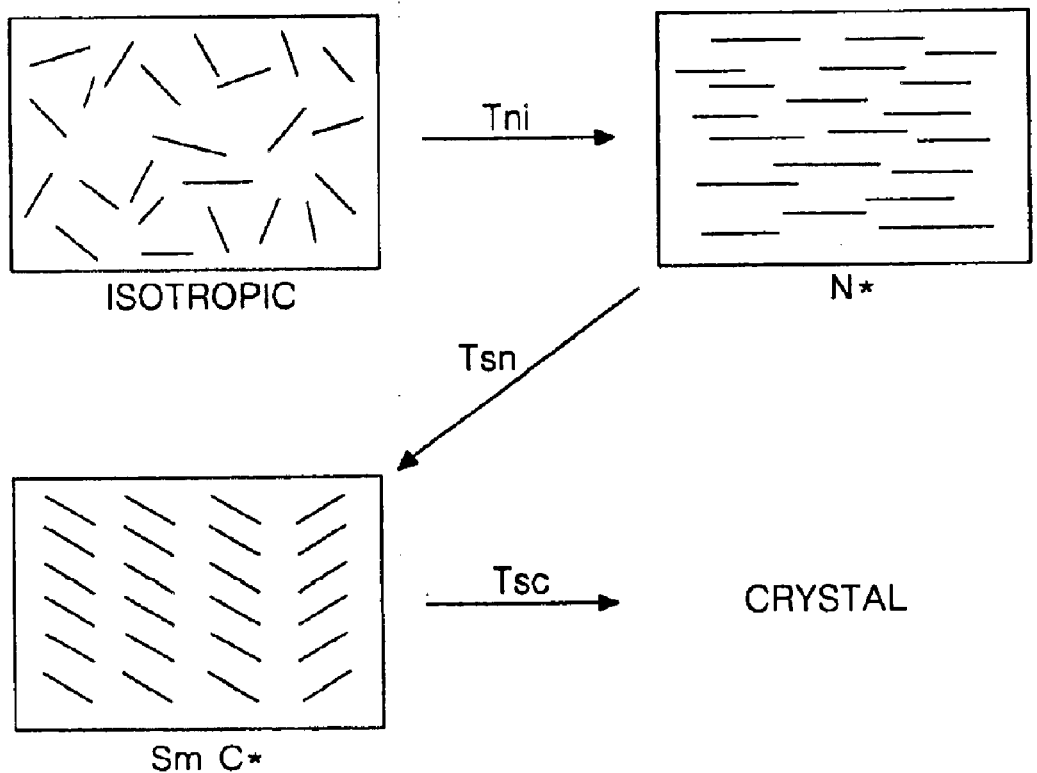
FIG. 2 illustrates phase transformations of Half V-Switching Mode ferroelectric liquid crystal material.
Figure 3:
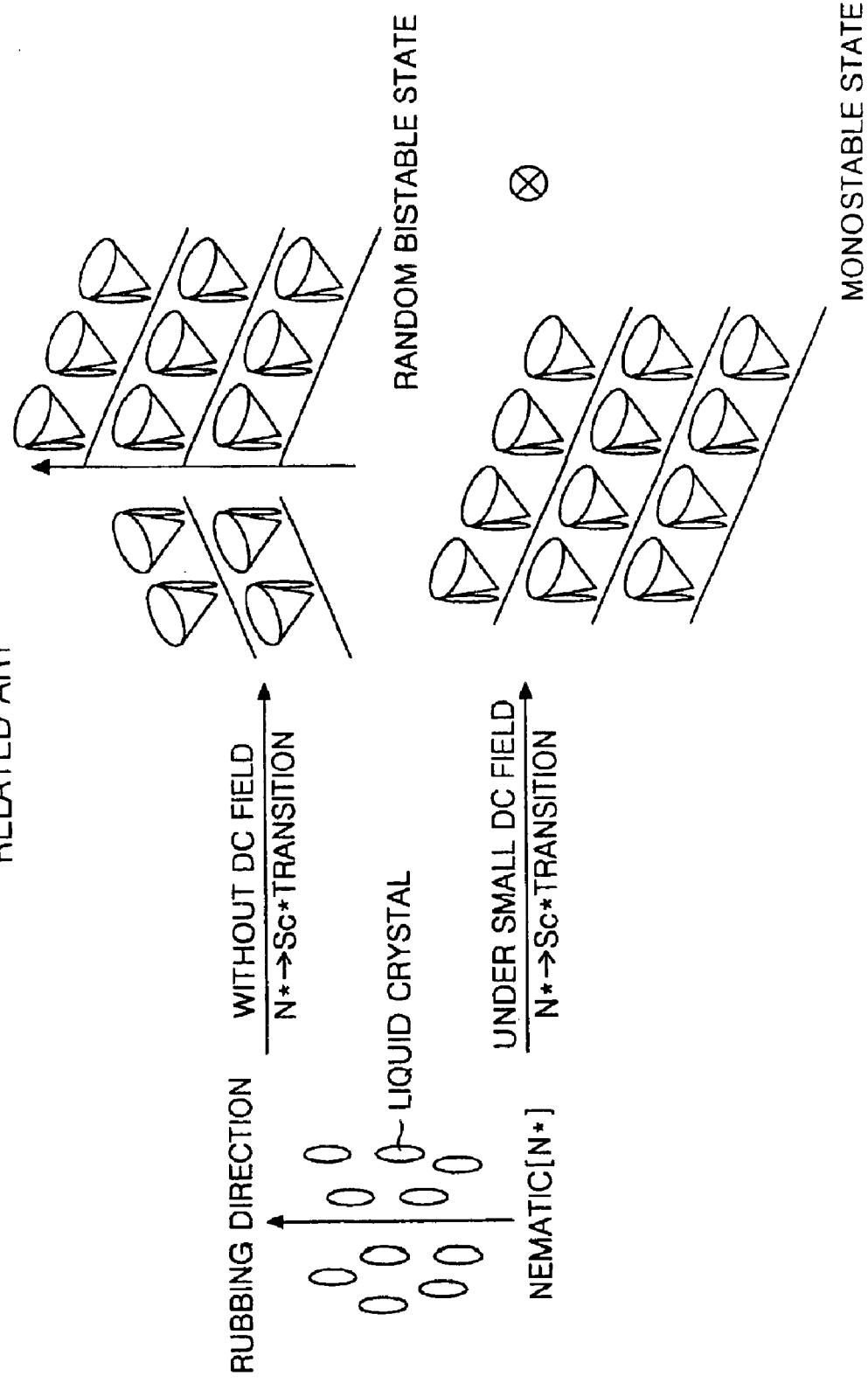
FIG. 3 illustrates the fabrication of a liquid crystal cell including Half V-Switching Mode ferroelectric liquid crystal material.
Figure 4A:
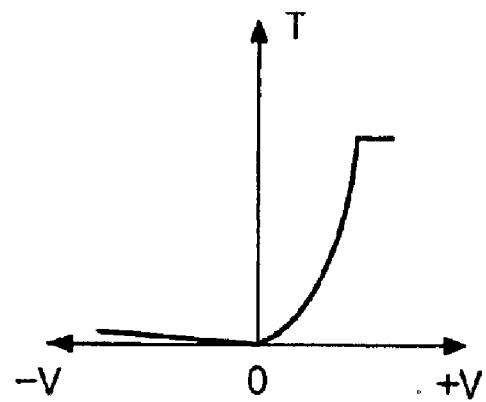
FIGS. 4A and 4B illustrate a relationship between transmissivity of incident light and driving data voltages applied to V-Switching Mode ferroelectric liquid crystal cells aligned in the presence of applied electric fields having opposite polarities.
Figure 4B:
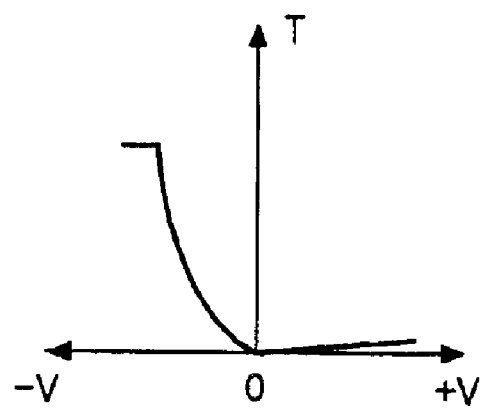
Figure 9:
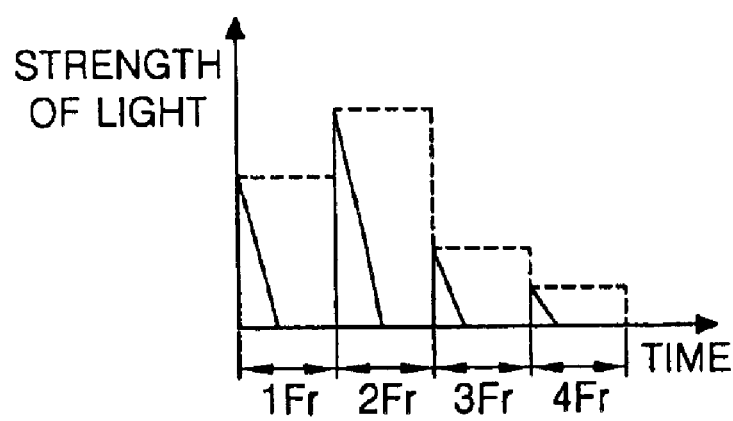
FIG. 9 illustrates light transmissivity characteristics of a cathode ray tube.
Figure 10:
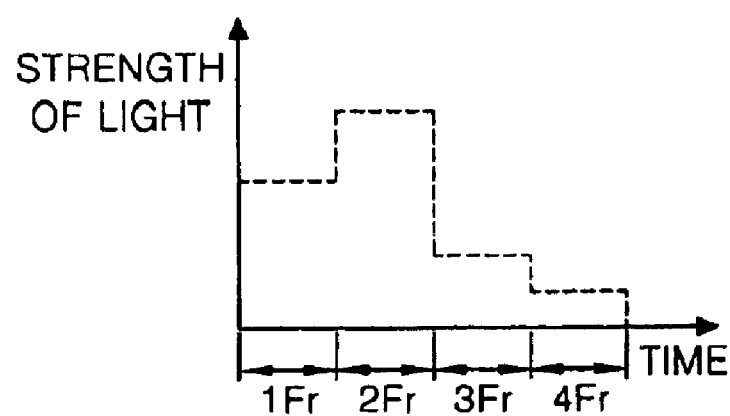
FIG. 10 illustrates light transmissivity characteristics of a related art liquid crystal display.
Figure 11:
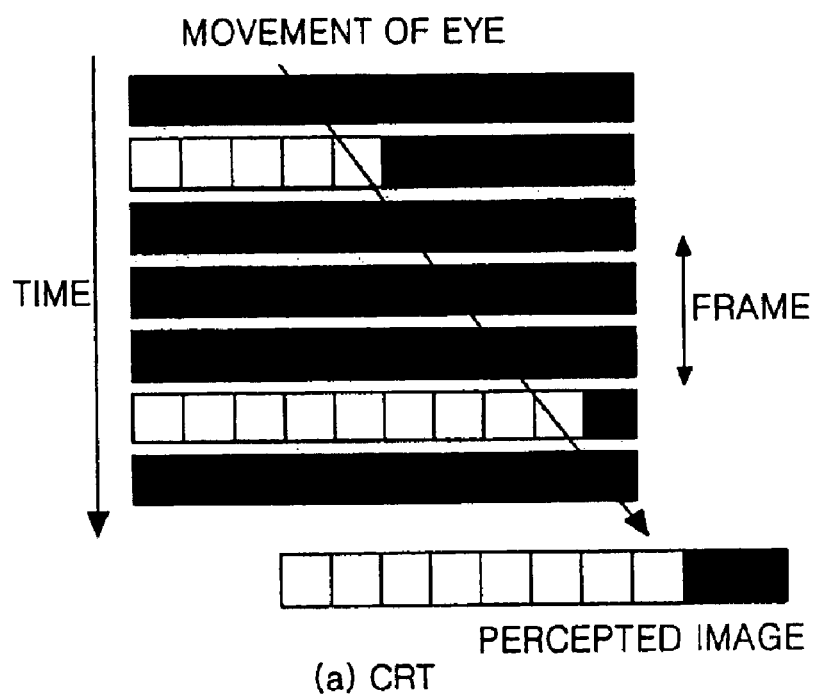
FIG. 11 illustrates an image perceived by an observer tracking a moving picture displayed by a cathode ray tube.
Figure 12:
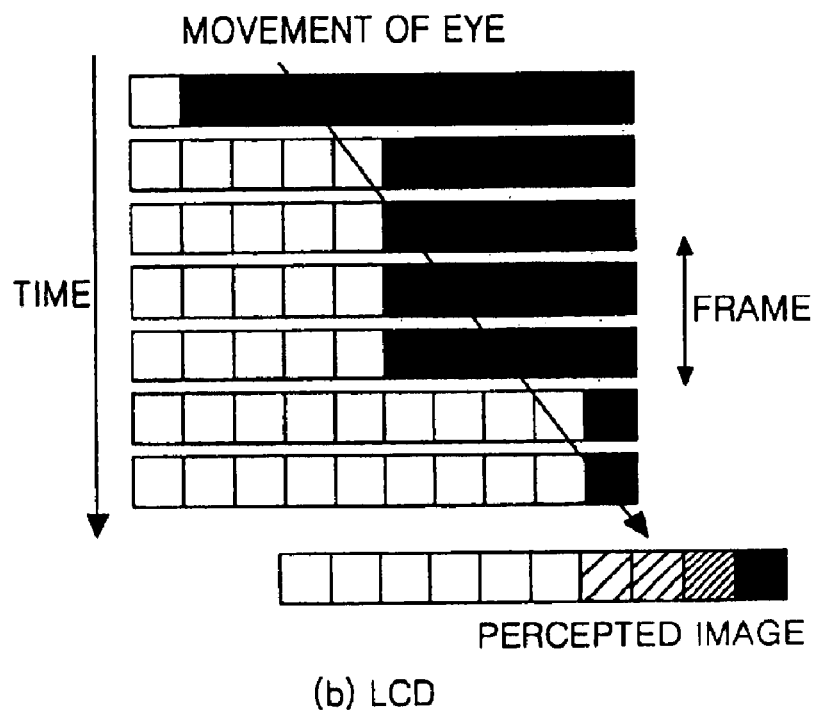
FIG. 12 illustrates an image perceived by an observer tracking a moving picture displayed in a related art liquid crystal display.
Figure 13:
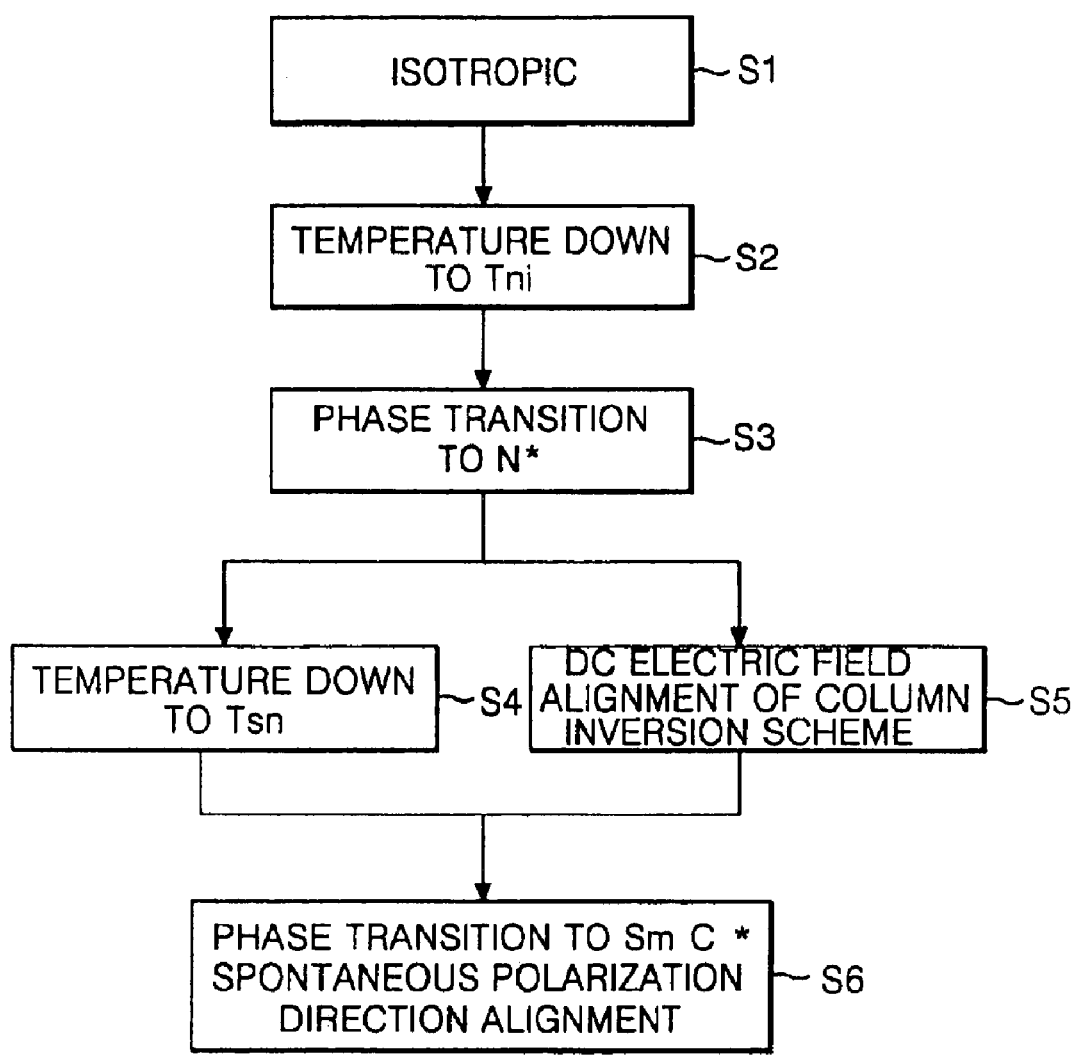
FIG. 13 illustrates a ferroelectric liquid crystal display electric-field-alignment method in accordance with the principles of the present invention.

FIG. 13 illustrates a ferroelectric liquid crystal display electric-field-alignment method in accordance with the principles of the present invention.

Referring to FIG. 13, a ferroelectric liquid crystal (FLC) display electric-field-alignment method according to the principles of the present invention may be performed by injecting FLC material into a liquid crystal display (LCD) panel having a plurality of liquid crystal cells arranged within a matrix pattern. In one aspect of the present invention, the LCD panel may include upper and lower glass substrates each supporting an alignment film, wherein the alignment direction of the alignment films are substantially parallel to each other. In another aspect of the present invention, the FLC material may be injected at a temperature at which the FLC material exhibits an isotropic phase (S1). The temperature of the injected FLC material exhibiting the isotropic phase may be lowered below a first phase transformation temperature (Tni) (S2) such that the cooled injected FLC material exhibits a nematic phase (N*) (S3). Next, the temperature of the cooled FLC material exhibiting the nematic phase (N*) may be further lowered below a second phase transformation temperature (Tsn) (S4) while applying an electric filed to the LCD panel sufficient to induce a spontaneous polarization of the FLC material. Accordingly, the FLC material may be aligned in correspondence with the applied electric field as the FLC material is cooled to exhibit a smectic C phase (Sm C*) (S6). Upon combining the cooling and application of the electric field, a FLC material exhibiting the monostable state may be obtained. In one aspect of the present invention, the injection temperature may be about 100° C. In another aspect of the present invention the first phase transformation temperature (Tni) may be about 90° C. to about 100° C. In still another aspect of the present invention, the second phase transformation temperature (Tsn) may be about 60° C. to about 80° C. The first and second transformation temperatures (Tni and Tsn, respectively) may vary according to the type of FLC material injected. In yet another aspect of the present invention, the applied electric field may be generated by applying a voltage directly to upper and lower electrodes of the LCD panel. In still another aspect of the present invention, the applied electric field may be generated by applying a direct current voltage of about ±1–9V to the LCD panel. In another aspect of the present invention, the applied electric field may have an alignment polarity pattern wherein a polarity of the electric field applied to the LCD panel may be inverted between vertical lines of liquid crystal cells within the LCD panel. In one aspect of the present invention, the direction of the spontaneous polarization of the FLC material may be substantially identical to a direction of the applied electric field. In another aspect of the present invention, the FLC material may be dispensed onto one of the substrates, rather than being injected between the two substrates. Accordingly, after the FLC material is dispensed onto one of the substrates, the other of the substrates on which the FLC material is not dispensed is bonded to the substrate having the dispensed FLC material.

In accordance with the principles of the present invention, the FLC material may be injected into the liquid crystal cells of the LCD panel at a temperature at which the liquid crystal material exhibits the nematic (N*) phase. Accordingly, the aforementioned steps S1 and S2 may be omitted and the FLC display may be fabricated by performing only the aforementioned steps S3–S6.

Figure 14:
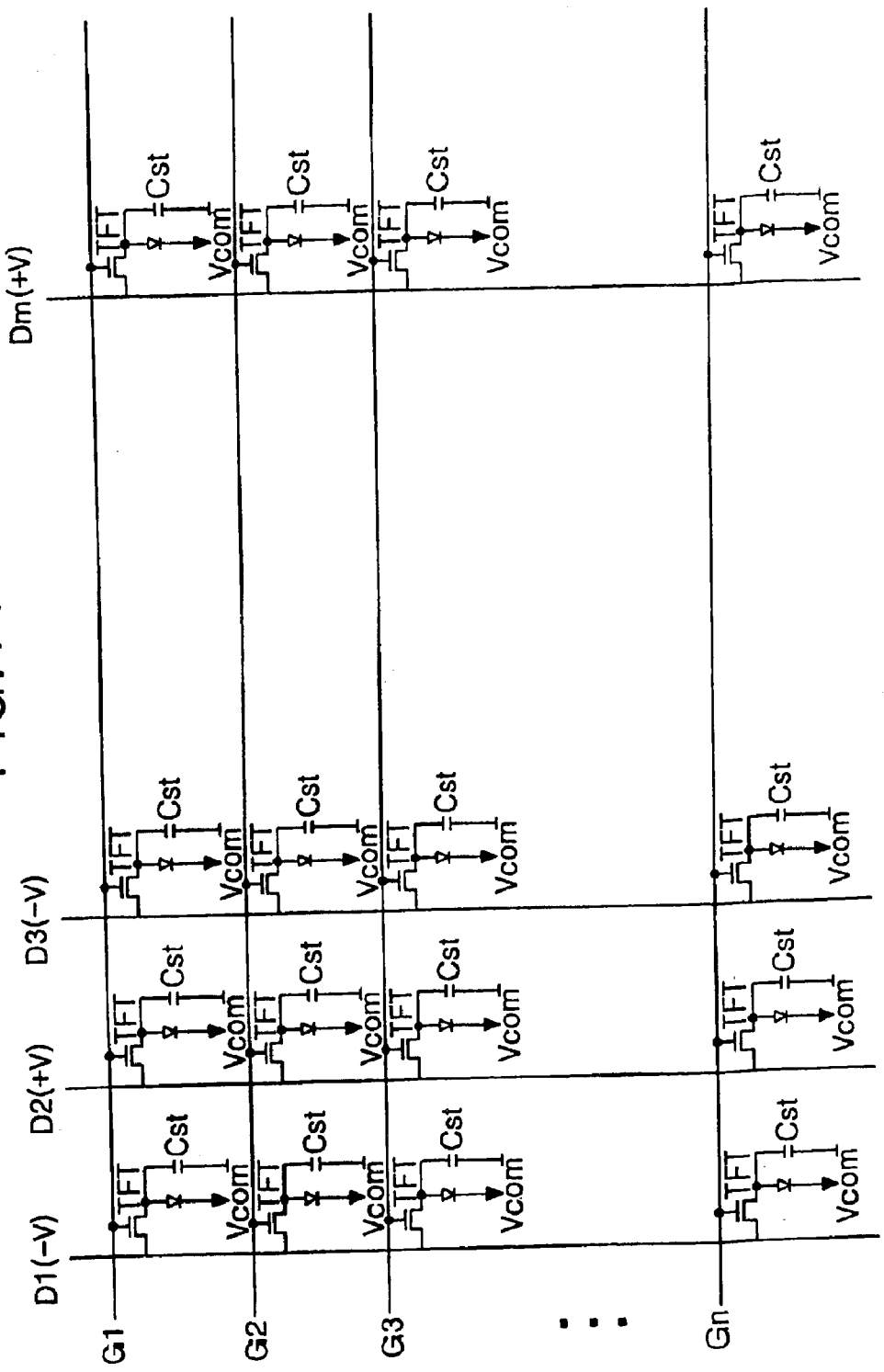
FIG. 14 illustrates an equivalent circuit diagram of a ferroelectric liquid crystal display in accordance with the principles of the present invention.
Figure 15:
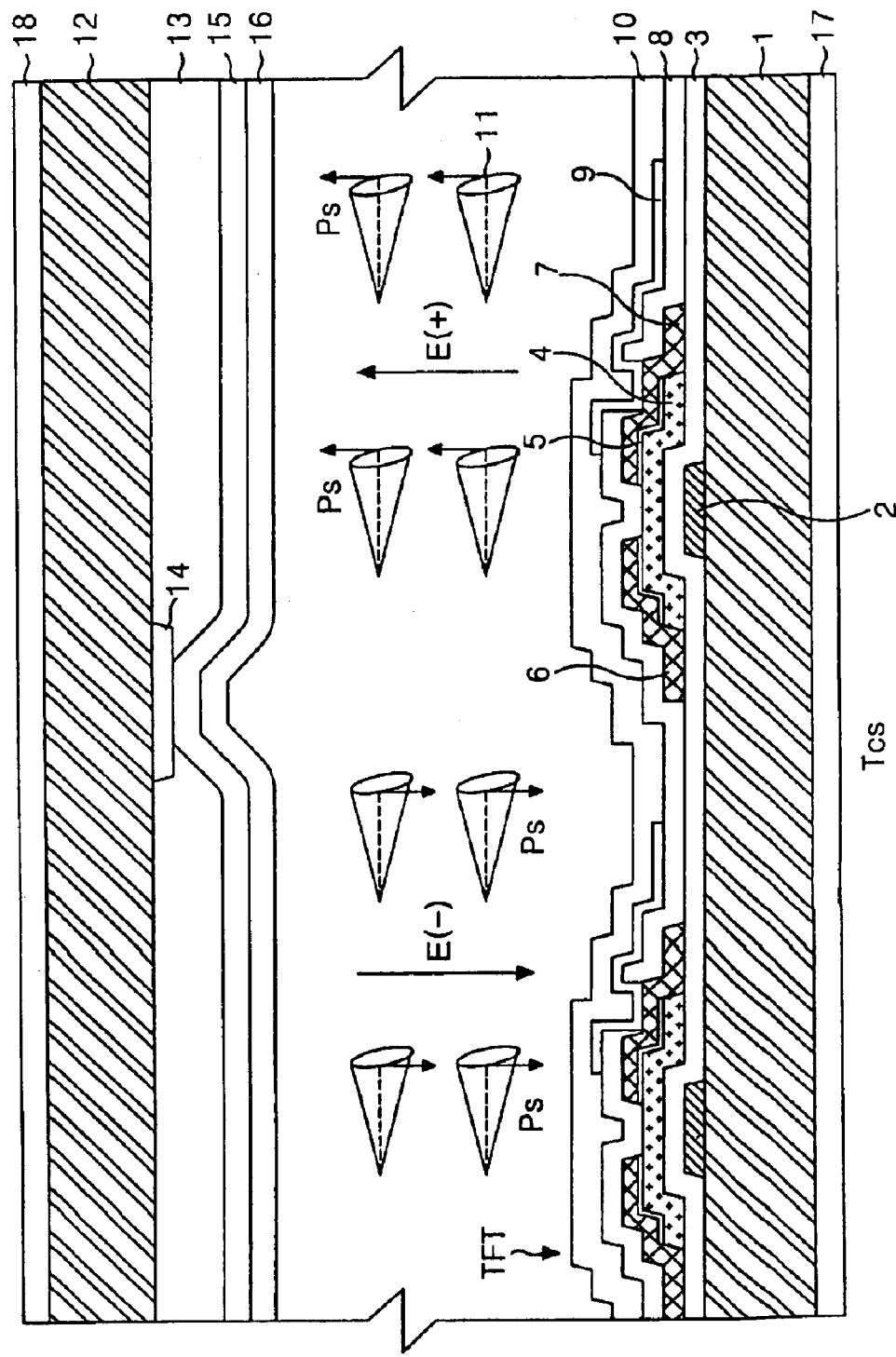
FIG. 15 illustrates a cross-sectional view of liquid crystal cells arranged within two adjacent vertical lines of liquid crystal cells of a ferroelectric liquid crystal display in accordance with the principles of the present invention.

FIG. 14 illustrates an equivalent circuit diagram of a ferroelectric liquid crystal display in accordance with the principles of the present invention. FIG. 15 illustrates a cross-sectional view of two adjacent liquid crystal cells of a ferroelectric liquid crystal display in accordance with the principles of the present invention.

Referring FIGS. 14 and 15, the FLC display of the present invention may, for example, include a thin film transistor (TFT) array substrate 1 supporting "n" number of gate lines (G1 to Gn) and "m" number of data lines (D1 to Dm), substantially perpendicularly crossing the n gate lines. In one aspect of the present invention, liquid crystal cells may be defined by, and TFTs may be formed at, the crossings of the gate and data lines, wherein the TFTs are provided for driving corresponding ones of liquid crystal cells. The FLC display may further include a color filter array substrate 12 supporting a black matrix layer 14 and color filter layer 13. FLC material 11 may be injected between the TFT array substrate 1 and color filter array substrate 12.

First and second metallic layers may each be deposited and patterned on the TFT array substrate 1. The first metallic layer may be deposited and patterned to form a plurality of gate electrodes 2 protruding from respective ones of the gate lines G1 to Gn. Accordingly, scan signals (e.g., gate high voltages) may be applied to gate electrodes 2 of each TFT via respective ones of the gate lines G1 to Gn. The second metallic layer may be deposited and patterned to form a plurality of source electrodes 6 protruding from respective ones of the data lines D1 to Dm and a plurality of drain electrodes 7, spaced apart from respective ones of the plurality of source electrodes 6. The plurality of drain electrodes may be connected to respective ones of subsequently formed pixel electrodes 9 within each liquid crystal cell. A gate insulating film 3 formed of an inorganic insulating material may be formed between the two patterned metallic layers and electrically insulate the first metallic layer from the second metallic layer. An active layer 4 and an ohmic contact layer 5 may be formed between the gate insulating film 3 and the source and drain electrodes 6 and 7, to provide a channel between the source and drain electrodes of the TFT. In one aspect of the present invention, the active layer 4 may be formed of intrinsic amorphous silicon material. In another aspect of the present invention, the ohmic contact layer 5 may be formed of semiconductor material doped with n-type or p-type impurities. A protection layer 8, formed of an organic or inorganic insulating material may be formed over the entire surface of the TFT array substrate, including the TFTs and the gate insulating film 3. Pixel electrodes 9 may be formed to electrically connect with respective ones of the previously formed drain electrodes 7 through contact holes formed in predetermined regions of the protection layer 8. A first alignment film 10 may be formed over the entire surface of the TFT array substrate 1 and may contact subsequently injected FLC material 11. In one aspect of the present invention, the surface of the first alignment film 10 that is contactable by the FLC material may include a plurality of grooves (not shown) for aligning molecules of liquid crystal material along a first alignment direction. A first polarization plate 17 may be mounted to the rear surface of TFT array substrate 1 for selectively transmitting light having a first linear polarization direction.

The color filter array substrate 12 may support the black matrix 14 layer, wherein the black matrix layer 14 prevents light leakage at a boundary region between adjacent liquid crystal cells provided with liquid crystal material having undesirable optical transmittance properties. The color filter layer 13 may be provided over the black matrix layer 14 for selectively transmitting light having predetermined wavelength ranges corresponding to red, green, and blue colors. A common electrode 15 may be formed over the entire surface of the color filter array substrate 12 including the black matrix layer 14 and the color filter layer 13. In one aspect of the present invention, the common electrode 15 may be formed of a transparent conductive material. In another aspect of the present invention the common electrode 15 may be formed via a evaporation deposition technique or the like. A second alignment film 16 may be formed over the entire surface of the color filter array substrate 12 and may contact subsequently injected FLC material 11. In one aspect of the present invention, the surface of the second alignment film 16 that is contactable by the FLC material may include a plurality of grooves (not shown) for aligning molecules of liquid crystal material along a second alignment direction, substantially parallel to the first alignment direction. A second polarization plate 18 may be mounted to the front surface of the color filter array substrate 12 for selectively transmitting light having a second linear polarization direction. In one aspect of the present invention, the first linear polarization direction and the second linear polarization direction may be substantially perpendicular.

According to the principles of the present invention, data lines D1 to Dm may be connected to a data driving circuit (not shown) and may be driven by the data driving circuit in accordance with a column inversion driving method. In one aspect of the present invention, gate lines G1 to Gn may be commonly connected to a conductive shorting bar (not shown).

During alignment of the FLC material, a gate high voltage may be substantially simultaneously applied to the gate lines G1 to Gn within the LCD panel via the shorting bar. Upon applying the gate high voltage to the shorting bar, channels between source and drain electrodes 6 and 7 of the TFT become electrically conductive and conduct a data voltage, applied to the data lines D1 to Dm, from the source electrode 6 to the drain electrode 7. In one aspect of the present invention, the data voltage may be applied to the data lines D1 to Dm according to a column inversion driving method wherein the polarity of the applied data voltage is inverted between consecutive ones of data lines D1 to Dm. For example, and with reference to FIG. 14, a data voltage having a negative polarity (−V) may, for example, be applied to odd data lines D1, D3, . . . , Dm−1 while a data voltage having a positive polarity (V+) may, for example, be applied to even data lines D2, D4, . . . , Dm. Accordingly, a data voltage having the negative polarity (−V) may be applied to pixel electrodes 9 connected to odd data lines D1, D3, . . . , Dm−1 through the conductive channel between source and drain electrodes 6 and 7 of the TFTs and a data voltage having the positive polarity (+V) may similarly be applied to pixel electrodes 9 connected to even data lines D2, D4, . . . , Dm. According to the principles of the present invention, the aforementioned gate high and data voltages may be applied to the gate and data lines, respectively, as the temperature of the FLC material is lowered below the second phase transformation temperature (Tsn), wherein the phase of the FLC material transforms from the nematic phase (N*) to the smectic C phase (Sm C*).

By applying the data voltage having the negative polarity (−V) to the odd vertical lines of liquid crystal cells, the FLC material within the odd vertical lines of liquid crystal cells spontaneously polarize along a spontaneous polarization direction (Ps) that is substantially identical to a direction of a negative electric filed (−E) generated as a result of the application of the data voltage having the negative polarity (−V). By applying the data voltage having the positive polarity (+V) to the even vertical lines of liquid crystal cells, the FLC material within the even vertical lines of liquid crystal cells spontaneously polarize along a spontaneous polarization direction (Ps) that is substantially identical to a sub-direction of a positive electric filed (+E) generated as a result of the application of the data voltage having the positive polarity (+V).

Accordingly, odd vertical lines of liquid crystal cells (Clc) may transmit light in the presence of an applied driving data voltage having a positive polarity (+V), wherein the amount of light transmitted may be determined by the magnitude of the applied data voltage. Similarly, even vertical lines of liquid crystal cells (Clc) may transmit light in the presence of an applied driving data voltage having a negative polarity (−V), wherein the amount of light transmitted may be determined by the magnitude of the applied data voltage.

Referring still to FIG. 14, storage capacitors (Cst) may be connected to and maintain data voltages applied to corresponding ones of liquid crystal cells (Clc). In one aspect of the present invention, each storage capacitor (Cst) may be connected between a liquid crystal cell (Clc) and a preceding one of the gate lines G1 to Gn−1 or between a liquid crystal cell (Clc) and a common line (not shown).

Figure 16:
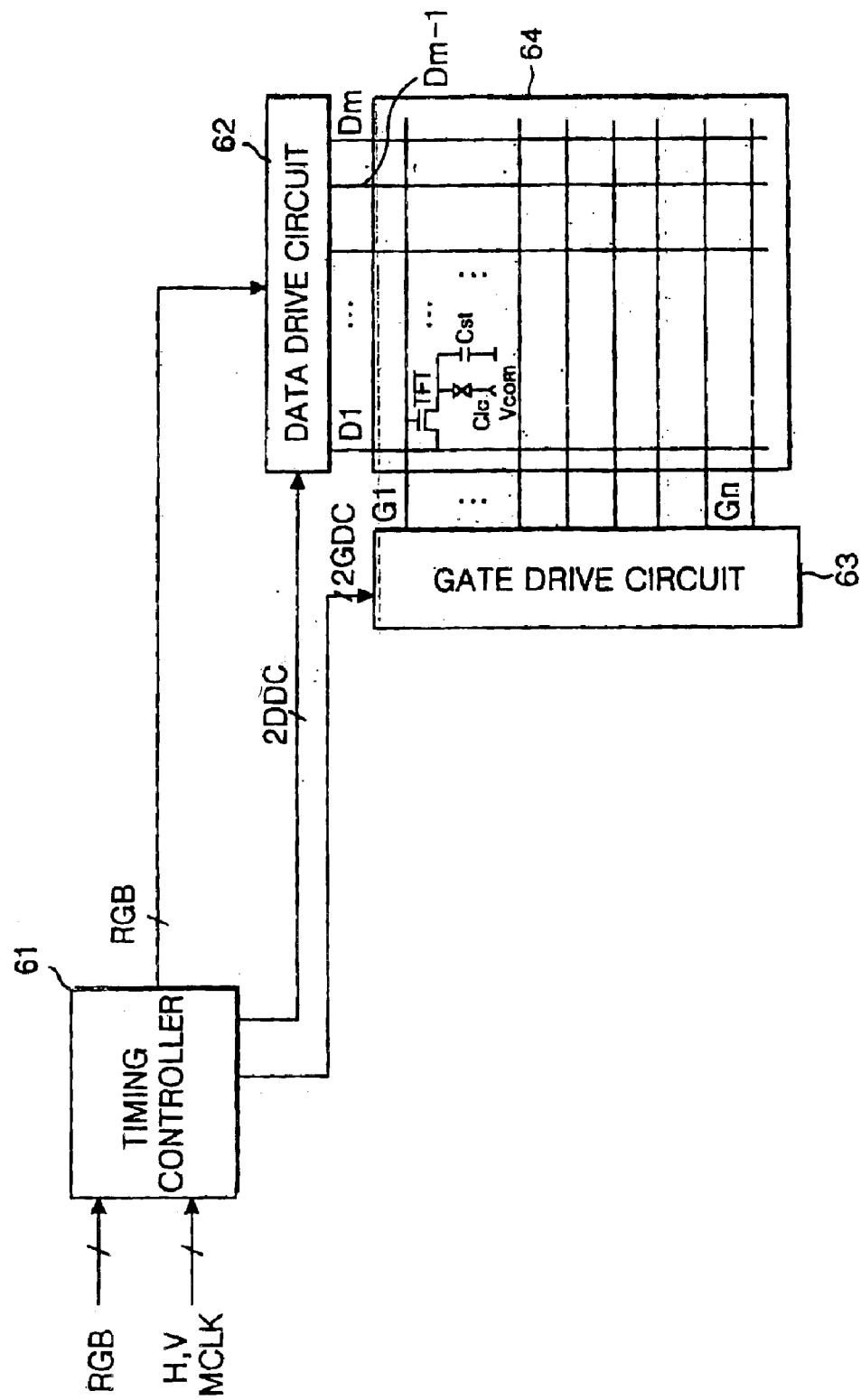
FIG. 16 illustrates a block diagram of a driving apparatus for the ferroelectric liquid crystal display according to the principles of the present invention.

FIG. 16 illustrates a driving apparatus of liquid crystal display according to the principles of the present invention.

Referring to FIG. 16, a driving apparatus in accordance with the principles of the present invention may, for example, be coupled to the aforementioned LCD panel 64 having a plurality of Half V-Switching Mode FLC cells arranged in matrix pattern. The driving apparatus may include a data driving circuit 62 for applying data voltages to data lines D1 to Dm of LCD panel 64 in accordance with a column inversion driving method, a gate driving circuit 63 for applying scan pulses to gate lines G1 to Gn of LCD panel 64, and a timing controller 61 for driving the data and gate driving circuits 62 and 63 at least twice during each frame period of the LCD panel.

According to the principles of the present invention, the timing controller 61 may double the frequency of an externally applied main clock signal (MCLK), vertical synchronizing signal (V), and horizontal synchronizing signal (H) outputted from a main driving circuit board (not shown). Further, the timing controller 61 may generate frequency-doubled gate and data control signals (2GDC) and (2DDC), respectively, using the vertical and horizontal synchronizing signals (V) and (H) having the doubled frequency. In accordance with the principles of the present invention, the frequencies of the frequency-doubled gate and data control signals (2GDC) and (2DDC) may be substantially twice the frequencies of related art gate and data control signals that allow gate and data voltages to be applied only once during a single frame period of a LCD panel.

Figure 17:
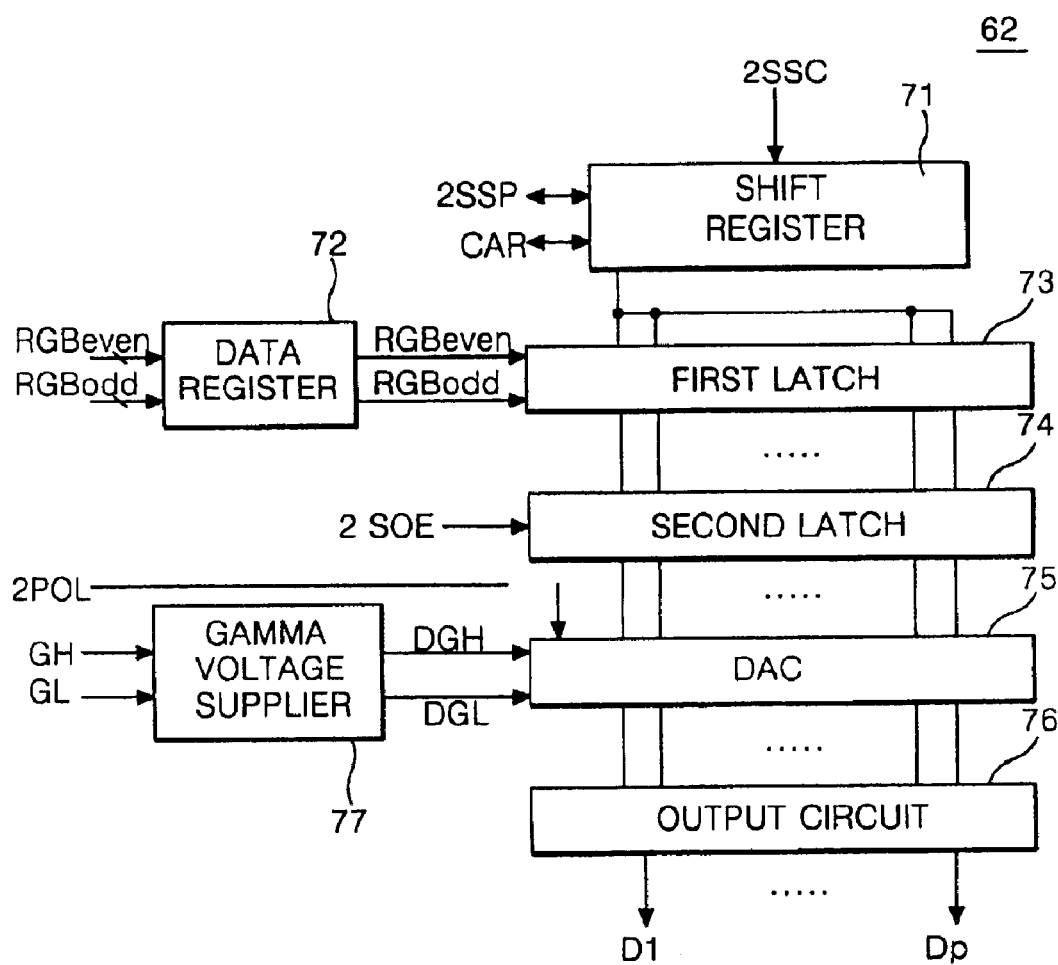
FIG. 17 illustrates a block diagram of the data driving circuit shown in FIG. 16.

Referring to FIG. 17, the data driving circuit 62 may be provided as a column inversion type data driving integrated circuit (IC) and may drive "p" number of the data lines D1 to Dm, wherein p is a positive integer smaller than m to drive m number of data lines D1 to Dm and may be mounted directly onto a glass substrate of the LCD panel. The data driving circuit 62 may, for example, include a shift register 71, data register 72, first latch 73, second latch 74, digital-to-analog converter (DAC) 75, and output circuit 76 connected in succession to the data lines D1 to Dm.

The frequency-doubled data control signal (2DDC) supplied to the column inversion type data driving circuit 62 may, for example, include a frequency-doubled source start pulse (2SSP), frequency-doubled source shift clock (2SSC), frequency-doubled source output signal (2SEO), and frequency-doubled polarity control signal (2POL), etc. The frequencies of the aforementioned components of the frequency-doubled data control signal (2DDC) may be substantially twice the frequencies of related art components of data control signals that control data voltages applied only once during a single frame period of a LCD panel.

The shift register 71 may shift the frequency-doubled source start pluse (2SSP) outputted by the timing controller 61 in accordance with the frequency-doubled source sampling clock (2SSC) to generate a sampling signal. Further, the shift register 71 may shift the frequency-doubled source start pulse (2SSP) and transfer carry signal (CAR) to a next stage shift register 71.

The data register 72 may store odd data (RGBodd) and even data (RGBeven), separated by timing controller 61, and supply the stored odd and even data (RGBodd, RGBeven) to the first latch 73 as digital pixel data.

In response to the sampling signal generated by the shift register 71, the first latch 73 sample the digital pixel data (e.g., RGBodd and RGBeven) supplied from data register 72, latch the sampled digital pixel data in correspondence with one horizontal line, and output previously latched sampled digital pixel data in correspondence with another horizontal line.

The second latch 74 may latch the digital pixel data corresponding to the another horizontal line outputted by the first latch 73 and output latched digital pixel data corresponding to yet another horizontal line in response to a frequency-doubled source output signal (2SOE) outputted by the timing controller 61.

Figure 18:
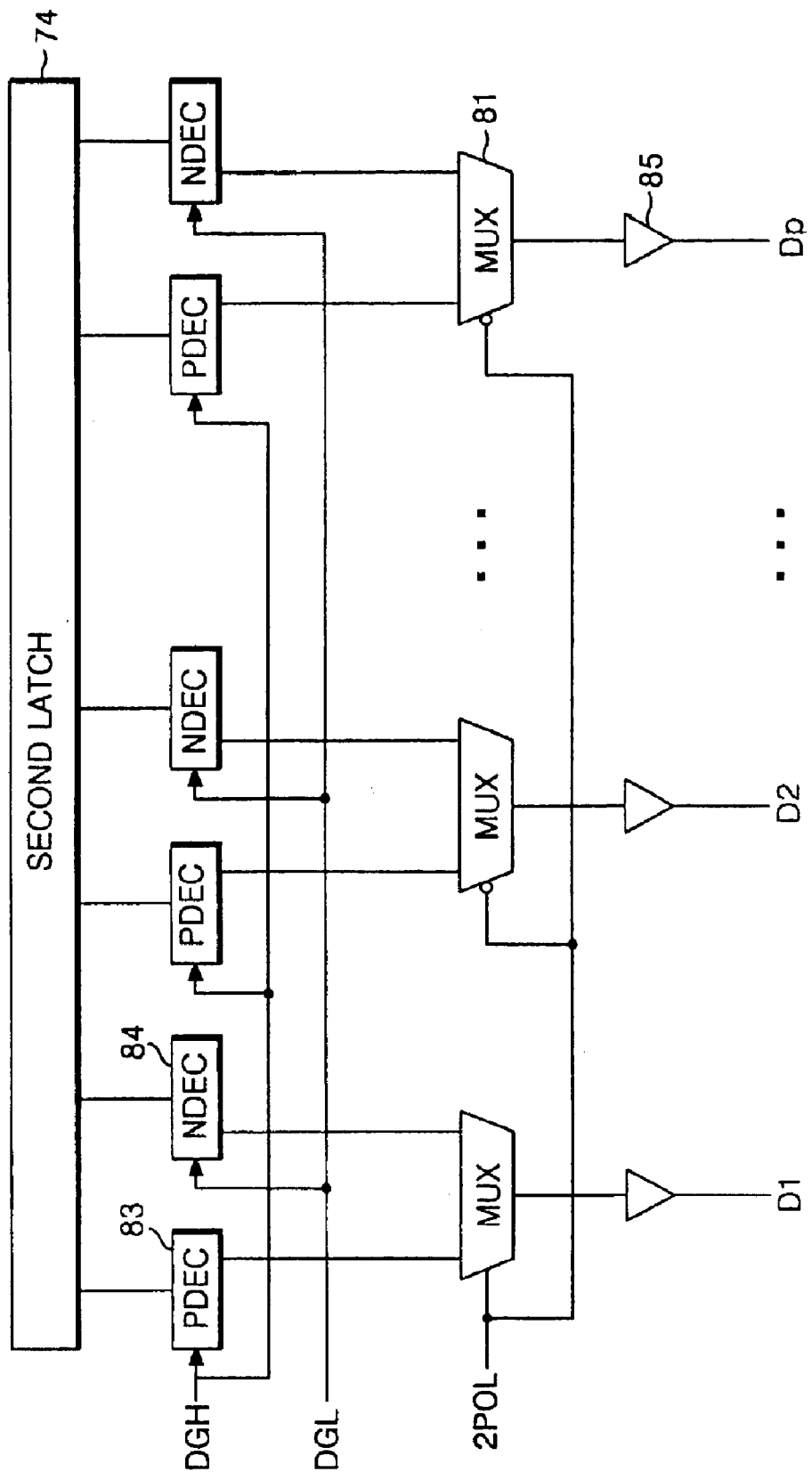
FIG. 18 illustrates a block diagram of the digital-to-analog converter shown in FIG. 17.

Referring to FIGS. 17 and 18, the DAC 75 may, for example, include, a P-decoder (PDEC) 83 from which a gamma voltage having a positive polarity (DGH) may be supplied, an N-decoder (NDEC) 84 from which a gamma voltage having a negative polarity (DGL) may be supplied, and a multiplexer 81 for selecting an output of one of the P-decoder 83 and the N-decoder 84. In one aspect of the present invention, the P-decoder 83 may decode digital pixel data outputted by the second latch 74 and select a corresponding positive polarity gamma voltage (DGH) to supply to a data line. In another aspect of the present invention, the N-decoder 84 may decode digital pixel data outputted by the second latch 74 and select a corresponding negative polarity gamma voltage (DGL) to supply to a data line. In one aspect of the present invention, the multiplexer 81 may alternately select the positive gamma voltage (DGH) and the negative gamma voltage (DGL) every half-frame period of the LCD panel 64 in response to the inputted frequency-doubled polarity control signal (2POL).

Referring back to FIG. 17, the output circuit 76 may be provided as a buffer and minimize a signal attenuation of data voltages supplied to data lines D1 to Dp.

The gamma voltage supplier 77 may subdivide standard gamma voltages outputted by a standard gamma voltage generating circuit (not shown) and supply subdivided gamma voltages to the DAC 75 in correspondence with gradations of brightness in an image. In one aspect of the present invention, the gamma voltage supplier 77 may, for example, include a circuit for generating the gamma voltage having the positive polarity (DGH) and a circuit for generating the gamma voltage having the negative polarity (DGL).

Figure 19:
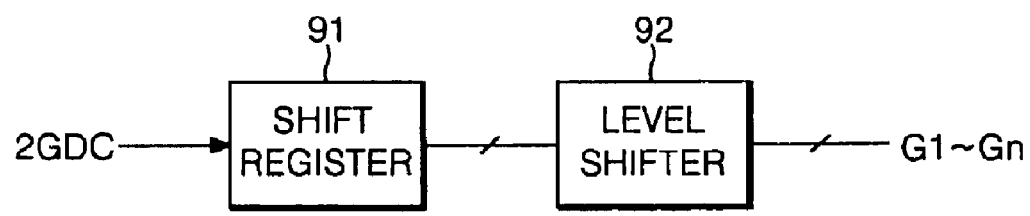
FIG. 19 illustrates a block diagram of the gate driving circuit shown in FIG. 16.

Referring now to FIGS. 16 and 19, the gate driving circuit 63 may, for example, include a shift register 91 for sequentially generating scan pulses (e.g., gate high voltages) in response to the frequency-doubled gate control signal (2GDC) outputted by the timing controller 61 and a level shifter 92 for shifting voltages of the scan pulses to levels suitable for driving liquid crystal cells (Clc) within the LCD panel 64.

Frequency-doubled gate control signal (2GDC) may, for example include frequency-doubled gate start pulse (2GSP), frequency-doubled gate shift clock (2GSC), frequency-doubled gate output signal (2GOE), etc. The frequencies of the aforementioned components of the frequency-doubled gate control signal (2GDC) components of the frequency-doubled data control signal (2DDC) may be substantially twice the frequencies of related art components of gate control signals that control gate voltages applied only once during a single frame period of a LCD panel. In one aspect of the present invention, the gate driving circuit 63 may sequentially generate n number of scan pulses every half of the frame period of the LCD panel 64 in response to the frequency-doubled gate control signal (2GDC).

Figure 20:
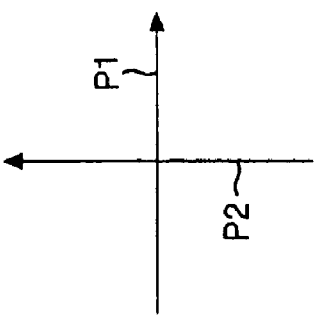
FIG. 20 illustrates the polarity of electric fields applied to align ferroelectric liquid crystal material in accordance with the principles of the present invention.

FIG. 20 illustrates the alignment polarity pattern of the electric field applied to the LCD panel in accordance with the principles of the present invention.

Referring to FIG. 20, FLC material within odd vertical lines of liquid crystal cells (e.g., liquid crystal cells located at (1,1) to (1,n), (3,1) to (3,n), . . . ,(m−1) to (m−1,n)) may be aligned in the presence of an applied electric field having a negative (−) polarity. In one aspect of the present invention, FLC material within even vertical lines of liquid crystal cells (e.g., liquid crystal cells located at (2,1) to (2,n), . . . ,(m−2,1) to (m−2,n), (m,1) to (m,n)) may be aligned in the presence of an applied electric field having a positive (+) polarity. Accordingly, and as described above, FLC material within the odd vertical lines of liquid crystal cells may spontaneously polarize along a different direction than FLC material within the even vertical lines of liquid crystal cells.

Figure 21:
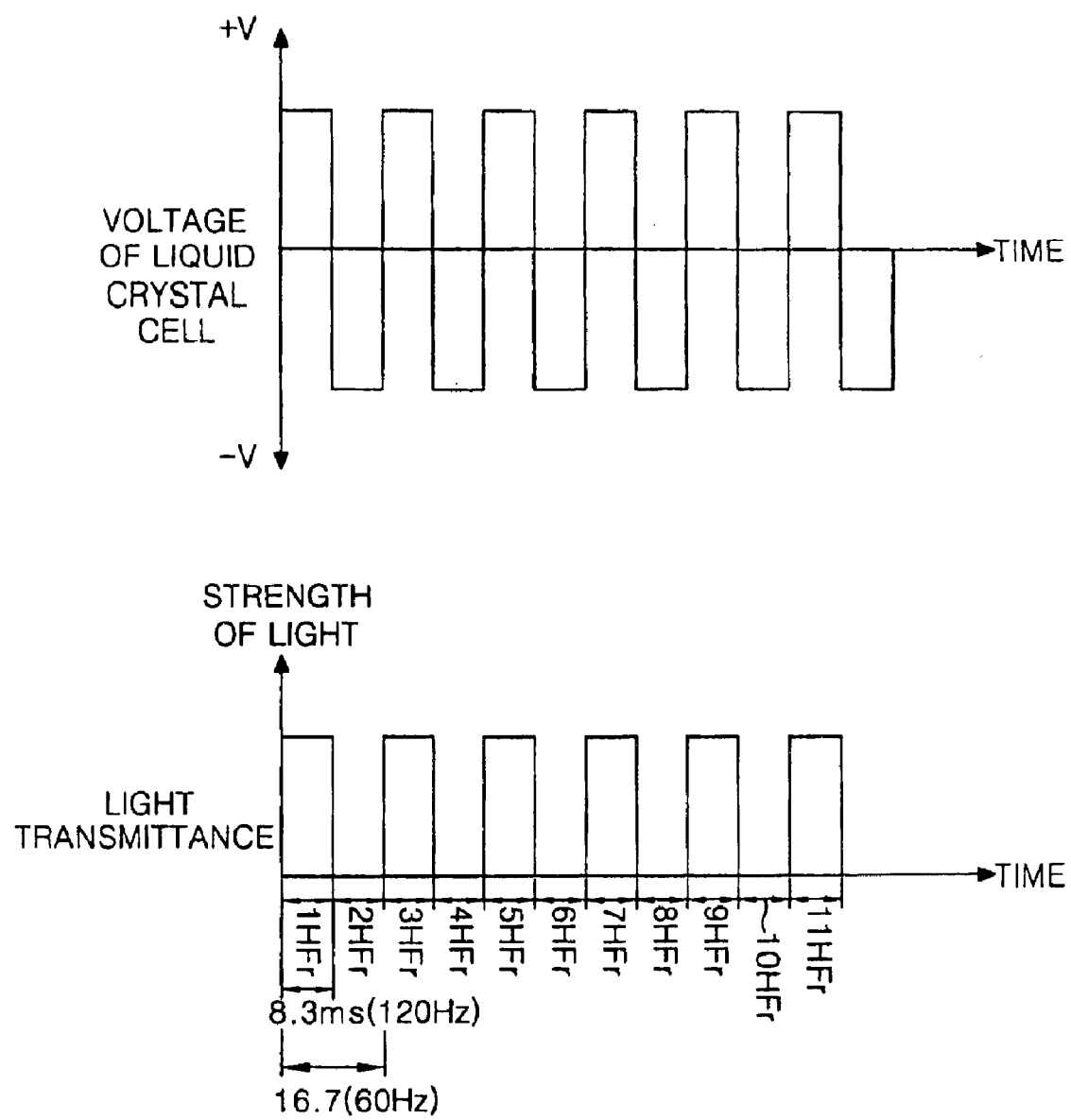
FIG. 21 illustrates a graph of a data voltage applied during driving of the liquid crystal cells shown in FIG. 20 and corresponding light transmissivity characteristics of the liquid crystal cells in accordance with the principles of the present invention.

FIG. 21 illustrates a graph of a driving data voltage applied to the liquid crystal cells shown in FIG. 20 and corresponding light transmissivity characteristics of the liquid crystal cells in accordance with the principles of the present invention.

Referring to FIG. 21, the frequency of the driving data voltage (120 Hz) is substantially twice the frame frequency of the LCD panel (60 Hz). Accordingly, the polarity inversion period of the driving voltages (about 8.3 ms) may be substantially half the frame period of the LCD panel (16.7 ms). Therefore, the polarity of the driving data voltages applied to the LCD panel may be inverted every half frame period of the LCD panel and applied to data lines D1 to Dm by the column inversion type data driving circuit 62 and the gate lines G1 to Gn by gate driving circuit 63. In one aspect of the present invention, the first half of each frame period of the LCD panel may be characterized as first sub-frame periods (e.g., 1HFr, 3HFr, . . . , 11HFr, etc.) while the second half of each frame period of the LCD panel may be characterized as second sub-frame periods (e.g., 2HFr, 4HFr, . . . , 10HFr, etc.).

Referring to FIG. 22A, during first sub-frame periods, vertical lines of liquid crystal cells (e.g., liquid crystal cells located at (1,1) to (1,n), (3,1) to (3,n), . . . ,(m−1) to (m−1,n)) may, for example, transmit light in the presence of an applied driving data voltage having a positive polarity (+V). In another aspect of the present invention, even vertical lines of liquid crystal cells (e.g., liquid crystal cells located at (2,1) to (2,n), (4,1) to (4,n), . . . ,(m) to (m,n)) may, for example, transmit light in the presence of an applied driving data voltage having a positive polarity (−V). Referring to FIG. 22B, during second sub-frame periods, vertical lines of liquid crystal cells (e.g., liquid crystal cells located at (1,1) to (1,n), (3,1) to (3,n), . . . ,(m−1) to (m−1,n)) may, for example, substantially intercept light in the presence of an applied driving data voltage having a positive polarity (+V). In another aspect of the present invention, even vertical lines of liquid crystal cells (e.g., liquid crystal cells located at (2,1) to (2,n), (4,1) to (4,n), . . . ,(m) to (m,n)) may, for example, substantially intercept light in the presence of an applied driving data voltage having a positive polarity (−V). Accordingly, the FLC LCD may selectively display pictures during the first sub-frame periods within each frame period of the LCD panel and may not display pictures during the second sub-frame periods within each frame period of the LCD panel.

Referring to FIGS. 20, 22A, and 22B, reference numerals 'P1' and 'P2' indicate the polarization axis of first and second polarization plates 17 and 18, respectively (as shown in FIG. 15).

Figure 23:
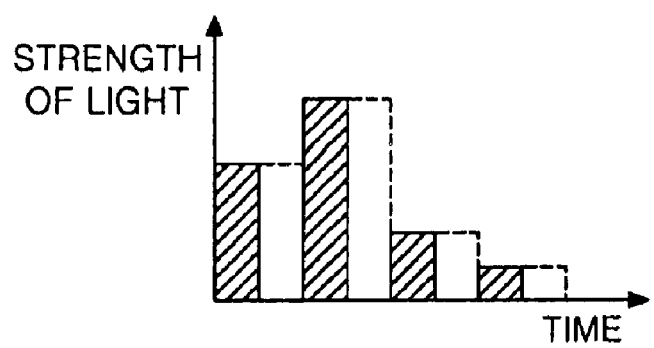
FIG. 23 illustrates impulse characteristics of the liquid crystal display according to the principles of the present invention.

According to the principles of the present invention, the FLC alignment method, apparatus, and driving method described above provides a high response speed and wide viewing angle to LCD panels. Further, the FLC material may be provided as Half V-Switching Mode FLC material having a relatively small capacitance C. In one aspect of the present invention, FLC material may be aligned in the presence of an applied electric field provided via a column inversion data driving system. In another aspect of the present invention, the FLC liquid crystal cells may be driven at a frequency of about 120 Hz. Accordingly, and with reference to FIG. 23, the FLC LCD of the present invention may be driven in a semi-impulse manner, wherein pictures may be displayed brightly during the first sub-frame periods while pictures may be displayed darkly during second sub-frame periods, similarly to the impulse driving type of CRTs.

Further in accordance with the principles of the present invention, the FLC alignment method may align FLC material within liquid crystal cells of an LCD panel in the presence of an applied electric field. In one aspect of the present invention, the applied electric field may include an alignment polarity pattern wherein a polarity of the applied electric field may be inverted, in accordance with a column inversion driving method, between vertical lines of liquid crystal cells within the LCD panel. In another aspect of the present invention, the column inversion driving method may be controlled in accordance with the driving method and driving apparatus may enable the displaying of pictures at high response speeds and minimizing a blurred motion and contour trailing phenomenon within moving pictures characteristic of impulse type devices.

It will be apparent to those skilled in the art that various modifications and variation can be made in the present invention without departing from the spirit or scope of the invention. For example, though it has been described that the LCD panel may be driven using signals having a frequencies substantially twice the frame frequency of the LCD panel, it will readily be apparent that the driving signals may have frequencies three times, four times, etc., the frame frequency of the LCD panel. Thus, it is intended that the present invention cover the modifications and variations of this invention provided they come within the scope of the appended claims and their equivalents.

What is claimed is:

1. A method of aligning ferroelectric liquid crystal material within a liquid crystal display, comprising:

providing a liquid crystal display (LCD) panel having a plurality of liquid crystal cells arranged in a matrix pattern;

providing ferroelectric liquid crystal (FLC) material within the plurality of liquid crystal cells at a first temperature;

cooling the FLC material below a phase transformation temperature sufficient to cause the FLC material to exhibit a smectic C phase; and applying an electric field to the LCD panel to align the FLC material during the cooling, wherein the applied electric field has a alignment polarity pattern wherein a polarity of the applied electric field is inverted between adjacent vertical lines of the liquid crystal cells.

2. The aligning method according to claim 1, wherein providing the FLC material includes injecting the FLC material.

3. The aligning method according to claim 1, wherein providing the FLC material includes dispensing the FLC material.

4. The aligning method according to claim 1, wherein the FLC material exhibits an isotropic phase at the first temperature.

5. The aligning method according to claim 1, wherein the FLC material exhibits a nematic phase at the first temperature.

6. The aligning method according to claim 1, wherein the phase transformation temperature is about 60° C. to about 80° C.

7. The aligning method according to claim 1, wherein the applying the electric field includes applying a voltage of about ±1–9V to the LCD panel.

8. The aligning method according to claim 1, wherein light is transmittable by liquid crystal cells containing the aligned FLC material in the presence of an applied electric field having a driving polarity pattern opposite the alignment polarity pattern.

9. A method of driving a ferroelectric liquid crystal display panel, comprising:

applying a first driving data voltage having a first polarity pattern to liquid crystal cells within a liquid crystal display (LCD) panel containing aligned ferroelectric liquid crystal (FLC) material during a first sub-frame period of the LCD panel, less than a frame period of the LCD panel, wherein the aligned FLC material is aligned in the presence of an applied electric field having an alignment polarity pattern wherein a polarity of the applied electric field is inverted between adjacent vertical lines of liquid crystal cells while cooling the FLC material below a phase transformation from a nematic phase to a smectic C phase; and applying a second driving data voltage having a second polarity pattern to the liquid crystal cells containing the aligned FLC material during a second sub-frame period of the frame period of the LCD panel, wherein the second polarity pattern is opposite the first polarity pattern, and wherein the second sub-frame period is substantially equal to a remainder of time within the frame period after the first sub-frame period.

10. The driving method according to claim 9, wherein polarities of driving data voltages having the first and second polarity patterns, provided to consecutively arranged ones of adjacent vertical lines of the LCD panel, are opposite each other.

11. The driving method according to claim 10, wherein the polarity of the driving data voltages applied to each of the liquid crystal cells is inverted between successive sub-periods.

12. The driving method according to claim 9, further comprising applying a scan signal to the LCD panel to select a horizontal line of liquid crystal cells to which the first and second driving data voltages are applied.

13. The driving method according to claim 9, wherein
the first polarity pattern is substantially identical to the alignment polarity pattern;
the second polarity pattern is opposite from the alignment polarity pattern; and
within each frame period of the LCD panel, the first sub-frame period occurs prior to the second sub-frame period.

14. The driving method according to claim 9, wherein light is transmittable by liquid crystal cells containing the aligned FLC material in the presence of an applied electric field having a driving polarity pattern opposite the alignment polarity pattern.

* * * * *